US009032360B1

(12) United States Patent
Cohen et al.

(10) Patent No.: US 9,032,360 B1
(45) Date of Patent: May 12, 2015

(54) SELECTING A TEST SCENARIO TEMPLATE BASED ON SIMILARITY OF TESTING PROFILES BELONGING TO DIFFERENT ORGANIZATIONS

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Raanana (IL)

( * ) Notice: Subject to any disclaimer, the term of this patent is extended or adjusted under 35 U.S.C. 154(b) by 0 days.

(21) Appl. No.: 14/142,784

(22) Filed: Dec. 28, 2013

Related U.S. Application Data

(63) Continuation-in-part of application No. 13/103,078, filed on May 8, 2011, now Pat. No. 8,739,128.

(60) Provisional application No. 61/747,313, filed on Dec. 30, 2012, provisional application No. 61/814,305, filed on Apr. 21, 2013, provisional application No. 61/919,773, filed on Dec. 22, 2013.

(51) Int. Cl.
 *G06F 9/44* (2006.01)

(52) U.S. Cl.
 CPC ........................................ *G06F 8/20* (2013.01)

(58) Field of Classification Search
 CPC .................................................. G06F 11/3864
 See application file for complete search history.

(56) References Cited

U.S. PATENT DOCUMENTS

| 5,629,878 | A | 5/1997 | Kobrosly |
| 6,360,332 | B1 | 3/2002 | Weinberg et al. |
| 6,810,494 | B2 | 10/2004 | Weinberg et al. |
| 6,865,692 | B2 | 3/2005 | Friedman et al. |
| 6,898,784 | B1 | 5/2005 | Kossatchev et al. |
| 7,032,212 | B2 | 4/2006 | Amir et al. |
| 7,581,212 | B2 | 8/2009 | West et al. |
| 7,809,525 | B2 | 10/2010 | Chagoly et al. |
| 7,849,447 | B1 | 12/2010 | Karis et al. |
| 8,266,592 | B2 | 9/2012 | Beto et al. |
| 8,954,934 | B1 * | 2/2015 | Cohen et al. ................... 717/127 |
| 2008/0086348 | A1 | 4/2008 | Rao et al. |
| 2009/0106262 | A1 | 4/2009 | Fallen et al. |
| 2009/0183143 | A1 | 7/2009 | Li et al. |
| 2010/0192220 | A1 | 7/2010 | Heizmann et al. |
| 2010/0287534 | A1 * | 11/2010 | Vangala et al. ................ 717/124 |

(Continued)

OTHER PUBLICATIONS

Sreedevi Sampath, A Scalable Approach to User-session based Testing of Web Applications through Concept Analysis, 2004.

(Continued)

*Primary Examiner* — Philip Wang

(57) ABSTRACT

Selecting a test scenario template for a certain user based on similarity of a profile of template utilization by the certain user to profiles of template utilization by other users involves executing the following: receiving runs of test scenarios, run by a certain user belonging to a certain organization; identifying test scenario templates utilized by the certain user; generating a profile of the certain user based on the test scenario templates; receiving profiles of users belonging to different organizations; comparing between the profile of the certain user and the profiles of the users and identifying at least one profile of a user, from among the profiles of the users, which is similar to the profile of the certain user; and selecting a certain template from among templates indicated as utilized in the at least one profile.

20 Claims, 7 Drawing Sheets

(56) References Cited

U.S. PATENT DOCUMENTS

2013/0259350 A1* 10/2013 Sato et al. .................... 382/131
2014/0331212 A1* 11/2014 Gaikwad et al. ............. 717/131

OTHER PUBLICATIONS

Jinhua Li, Clustering User Session Data for Web Applications Test, 2011, Journal of Computational Information Systems.

G. Ruffo, R. Schifanella, and M. Sereno, WALTy: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

* cited by examiner

SELECTING A TEST SCENARIO TEMPLATE BASED ON SIMILARITY OF TESTING PROFILES BELONGING TO DIFFERENT ORGANIZATIONS

CROSS-REFERENCE TO RELATED APPLICATIONS

This Application is a Continuation-In-Part of application Ser. No. 13/103,078, filed May 8, 2011. This Application claims the benefit of U.S. Provisional Patent Application No. 61/747,313, filed Dec. 30, 2012, and U.S. Provisional Patent Application No. 61/814,305, filed Apr. 21, 2013. This application also claims the benefit of U.S. Provisional Patent Application No. 61/919,773, filed Dec. 22, 2013, the entire contents of which is herein incorporated by reference in its entirety for all that it teaches without exclusion of any part thereof.

The following co-pending US Patent Applications, filed on Dec. 27, 2013: Ser. Nos. 14/141,514; 14/141,564; 14/141,588; 14/141,623; 14/141,655; 14/141,676; 14/141,726; 14/141,859; 14/141,887; 14/141,925; 14/141,974, and the following co-pending US Patent Applications, filed on Dec. 28, 2013: Ser. Nos. 14/142,768; 14/142,769; 14/142,770; 14/142,771; 14/142,772; 14/142,774; 14/142,781; 14/142,783, may include related subject matter.

BACKGROUND

Testing is important for developing, maintaining, and updating software systems. For large software systems utilized by many organizations, testing is often a complex and expensive process. The software systems may involve many thousands transactions and business processes, each with various possible options and configuration possibilities. In such cases, it is difficult to determine which transactions and options need to be covered, and how to devise appropriate tests.

However, it is often the case that software systems belonging to different organizations utilize many software modules that are the same or similar, involving similar transactions and configuration options. Were organizations able to utilize each other's testing-related knowledge, which is in a sense a wisdom of the crowd (of testers), they might be able to come up with a more effective and efficient testing plan.

BRIEF SUMMARY

Some aspects of this disclosure involve methods, systems, and/or non-transitory computer-readable medium, which enable suggestion of test scenario templates to a certain user, based on similarity of a profile of the certain user to profiles of users belonging to different organizations. Thus, some embodiments enable organizations to utilize each other's testing-related knowledge to suggest to a certain user and/or organization effective tests that are likely to involve test scenario templates that that are relevant to the certain user and/or organization.

In some embodiments, the profiles indicate templates executed by the users. Finding profiles of users that are similar to the profile of the certain user may assist in discovering templates that may be relevant to the certain user. For example, there may be several users that execute tests instantiated from templates that were also utilized by the certain user (and thus all these users may have similar profiles). If the profiles of the several users include an indication of a certain template that has not been utilized by the certain user, it may be worthwhile to suggest the certain template to the certain user; the fact that the users have similar profiles to the profile of the certain user may indicate that the certain template may also be suitable for the certain user.

One aspect of this disclosure involves a computer system that is configured to select a test scenario template for a certain user based on similarity of a profile of template utilization by the certain user to profiles of template utilization by other users. The computer system may include a template identifier, profile generator, profile comparator, and a template selector. The template identifier is configured to receive runs of test scenarios, run by the certain user on a software system belonging to the certain organization. Additionally, the template identifier may be configured to identify, from the runs, test scenario templates utilized by the certain user. A template may be considered utilized by a user if the user runs an instantiation of the template. The profile generator is configured to generate a profile of the certain user. A generated profile may include indications of test scenario templates utilized by the certain user. For example, the templates may be identified by name, code, and/or test steps to be executed when running a test. The profile comparator is configured to receive the profile of the certain user and profiles of users belonging to different organizations; the certain organization is not one of the different organizations, and the profiles comprise indications of test scenario templates utilized by the users. The profile comparator is also configured compare between the profile of the certain user and the profiles of the users, and to identify at least one profile of a user, from among the profiles of the users, which is similar to the profile of the certain user. The template selector is configured to select a certain template from among templates indicated as utilized in the at least one profile; the profile of the certain user does not comprise indication that the certain user utilized the certain template.

In one embodiment, the system optionally includes a customization module configured to customize the certain template for the certain user by adding to the certain template proprietary data relevant to the certain user. In another embodiment, the system optionally includes a user interface configured to suggest to the certain user to run an instantiation of the certain template. In yet another embodiment, the system optionally includes a data cleaner configured to remove proprietary data from the certain template. In still another embodiment, the system optionally includes a test identifier configured to receive data obtained from monitoring the certain user running test scenarios on a software system that belongs to certain organization and to identify the runs of test scenarios. Optionally, the computer system also includes a monitoring module configured to monitor the certain user running the test scenarios on the software system that belongs to the certain organization.

Another aspect of this disclosure involves a computer implemented method for selecting a test scenario template for a certain user based on similarity of a profile of template utilization by the certain user to profiles of template utilization by other users. Executing the method may involve performing the following: Receiving runs of test scenarios, run by a certain user belonging to a certain organization on a software system belonging to the certain organization. Identifying, from the runs, test scenario templates utilized by the certain user; a template may be considered utilized by a user if the user runs an instantiation of the template. Generating a profile of the certain user based on the test scenario templates. Optionally, the profile indicates test scenario templates utilized by the certain user. Receiving profiles of users belonging to different organizations. The certain organization is not one of the different organizations, and the profiles indicate test scenario templates utilized by the users belonging to the different organizations. Comparing between the profile of the certain user and the profiles of the users and identifying at least one profile of a user, from among the profiles of the users, which is similar to the profile of the certain user. And selecting a certain template from among templates indicated as utilized in the at least one profile; wherein the profile of the certain user does not comprise indication that the certain user utilized the certain template.

In one embodiment, the computer method optionally includes a step involving customizing the certain template for the certain user by adding to the certain template proprietary data relevant to the certain user. In another embodiment, the computer method optionally includes a step involving suggesting to the certain user to run an instantiation of the certain test scenario template. In yet another embodiment, the computer method optionally includes a step involving indicating that no template is selected for the certain user if at least one of the following occurs: no profile from among the profiles of the users is identified as similar to the profile of the certain user, and no template is identified which is both appropriate for the certain user and the profile of the certain user does not comprise an indication that the template was utilized by the certain user. In still another embodiment, the computer method optionally includes a step involving removing proprietary data from the certain template. In one embodiment, the computer method optionally includes a step involving identifying the runs of test scenarios run by the certain user on a software system that belongs to the certain organization from data obtained from monitoring the certain user. Optionally, the computer method may optionally include a step involving monitoring the certain user running the test scenarios on the software system that belongs to the certain organization.

Yet another aspect of this disclosure involves a non-transitory computer-readable medium for use in a computer to select a test scenario template for a certain user based on similarity of a profile of template utilization by the certain user to profiles of template utilization by other users. The computer includes a processor, and the non-transitory computer-readable medium includes the following program code: Program code for receiving runs of test scenarios, run by a certain user belonging to a certain organization on a software system belonging to the certain organization. Program code for identifying, from the runs, test scenario templates utilized by the certain user. Optionally, a template may be considered utilized by a user if the user runs an instantiation of the template. Program code for generating a profile of the certain user based on the test scenario templates. The profile indicates test scenario templates utilized by the certain user. Program code for receiving and profiles of users belonging to different organizations. The certain organization is not one of the different organizations, and the profiles indicate test scenario templates utilized by the users belonging to the different organizations. Program code for comparing between the profile of the certain user and the profiles of the users and identifying at least one profile of a user, from among the profiles of the users, which is similar to the profile of the certain user. And program code for selecting a certain template, from among templates indicated as utilized in the at least one profile, which is appropriate for the certain user. The profile of the certain user does not comprise indication that the certain user utilized the certain template. Optionally, the certain template is utilized by at least two different users belonging to two different organizations of the different organizations.

In one embodiment, the non-transitory computer-readable medium optionally stores program code for selecting the certain template, from among templates that are indicated as utilized in the at least one profile, based on number of different users that utilized the templates. In another embodiment, the non-transitory computer-readable medium optionally stores program code for selecting the certain template, from among templates that are indicated as utilized in the at least one profile, based on number of different organizations with users that utilized the templates. In one embodiment, the non-transitory computer-readable medium optionally stores program code for customizing the certain template for the certain user by adding to the certain template proprietary data relevant to the certain user. In one embodiment, the non-transitory computer-readable medium optionally stores program code for suggesting to the certain user to run an instantiation of the certain test scenario template. In one embodiment, the non-transitory computer-readable medium optionally stores program code for removing proprietary data from the certain template. In one embodiment, the non-transitory computer-readable medium optionally stores program code for identifying the runs of test scenarios run by the certain user on a software system that belongs to the certain organization from data obtained from monitoring the certain user. Optionally, the non-transitory computer-readable medium may also store program code for monitoring the certain user running the test scenarios on the software system that belongs to the certain organization. Optionally, the same module of program code performs both the monitoring and the identifying of the runs of test scenarios run by the certain user.

BRIEF DESCRIPTION OF THE DRAWINGS

The embodiments are herein described, by way of example only, with reference to the accompanying drawings. In the drawings.

DETAILED DESCRIPTION

Figure 1:
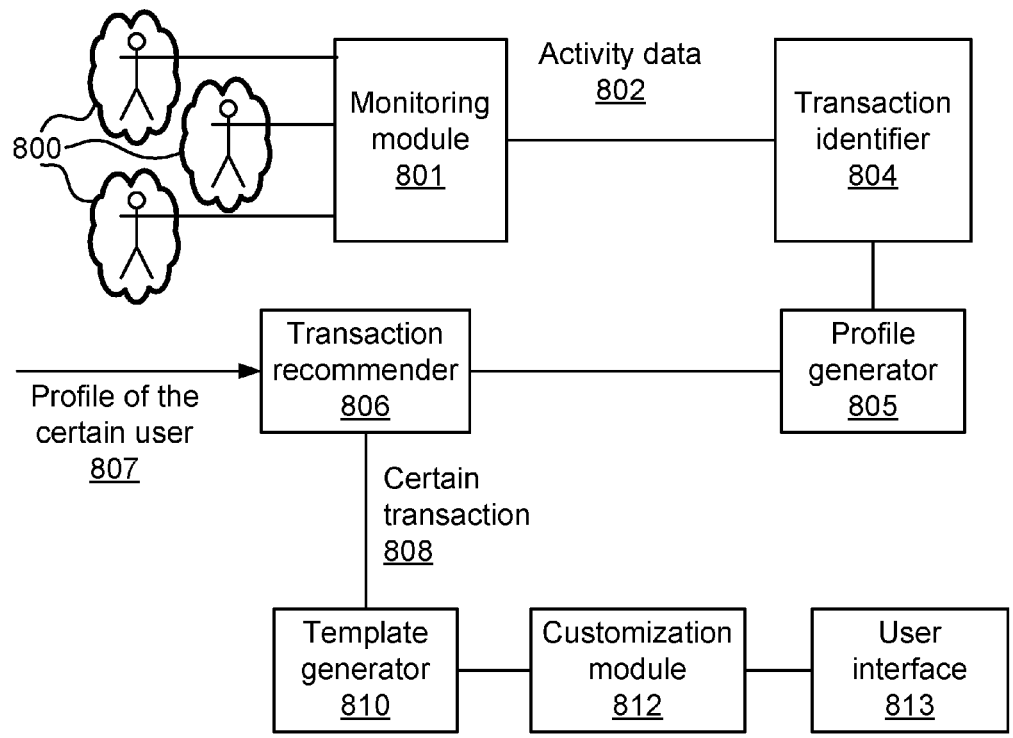
FIG. 1 illustrates one embodiment of a computer system configured to select a transaction for a certain user based on similarity of a profile of the certain user to profiles of users belonging to different organizations.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen). Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

FIG. 1 illustrates one embodiment of a computer system configured to select a transaction for a certain user based on similarity of a profile of the certain user to profiles of users belonging to different organizations. The illustrated embodiment includes at least a transaction identifier 804, a profile generator 805, and a transaction recommender 806.

The transaction identifier 804 is configured receive activity data 802 obtained by monitoring activity of the users on software systems belonging to the different organizations. Optionally, the activity data 802 is obtained from monitoring the users 800. The transaction identifier 804 is also configure to identify from the activity data 802 transactions that are run by the users. Optionally, the transactions are run as part of tests. Optionally, the transaction identifier 804 also identifies possible values that may be used by the transactions. Optionally, the users belong to the different organizations, i.e., each user belongs to an organization of the different organizations.

The profile generator 805 is configured to generate profiles of the users based on the transactions. Optionally, each profile of a user indicates transactions executed by the user. Optionally, an indication of the transactions in the profile of the user may be direct. For example, the profile of the user includes identifiers of transactions and/or includes the transactions themselves (e.g., commands or code of the transactions). Optionally, the indication of transactions in the profile of the user may be indirect. For example, the profile may list test scenarios and/or templates utilized by the user. Optionally, the test scenarios and/or templates may be known to involve certain transactions. For example, a description of a test scenario and/or template may include a description of transactions that are to be executed when running the test scenario and/or running an instantiation of the template.

The transaction recommender 806 is configured to receive a profile 807 of the certain user. The transaction recommender 806 is also configured to select, based on at least some of the profiles of the users and the profile 807 of the certain user, a certain transaction 808 from among transactions that are indicated in the profiles of the users, which is appropriate for the certain user. Optionally, the certain user belongs to a certain organization that is not one of the different organizations. Optionally, the certain transaction 808 is indicated in a profile of at least one user with a similar profile to the profile 807 of the certain user. Additionally or alternatively, the certain transaction 808 was executed by at least one user with a similar profile to the profile 807 of the certain user.

In one embodiment, the certain transaction 808 was not executed by the certain user and/or does not appear in the profile 807 of the certain user. Optionally, the certain transaction 808 was not executed by a user belonging to the certain organization and/or does not appear in a profile of a user belonging to the certain organization.

In one embodiment, the profile 807 of the certain user indicates transactions executed by the certain user. Additionally or alternatively, the profile 807 may indicate runs of test scenarios run by the certain user, clusters of runs, and/or templates which were utilized by the certain user (e.g., the certain user ran instantiations of the template). By comparing the profile of the certain user to profiles of the users, it is possible to identify profiles of users that are similar to the profile 807 of the certain user. For example, at least some of the transactions executed by the certain user were also executed by users that have similar profiles to the profile 807 of the certain user.

In one embodiment, the profile 807 is generated by the profile generator 805. Optionally, the profile 807 is generated based on activity data of the certain user that is provided to the transaction identifier 804.

In one embodiment, both the profiles of the users and the profile 807 of the certain user may contain the same type of data. For example, both the profiles of the users and the profile 807 of the certain user may contain indications of transaction that were executed (e.g., by listing identifiers of the transactions and/or commands that execute the transactions). In such a case, a comparison between profiles may be straightforward. For example, counting the number and/or proportion of transactions that are common to two profiles. In another example, having the same type of data in the profiles makes it easy to convert them to vectors in the similar space, and then to utilize similarity functions that may be applied to vectors (e.g., vector dot-product or Pearson correlation).

In one embodiment, the profiles of the users and the profile 807 of the certain user may contain different types of data. Thus, comparing between a profile of a user and a profile 807 of the certain user may require additional actions that convert a representation of a profile that uses one type of data to a representation using another type of data. In one example, the profile 807 of the certain user may include templates of test scenarios run by the certain user and the profiles of the users may include indications of transactions executed by the users. In such a case, it may be necessary to determine which transactions are involved when running instantiations of the templates listed in the profile 807 in order to be able to compare the profile 807 with the profiles of the users.

In one embodiment, the certain user is a generic user of the certain organization. For example, the profile 807 of the certain user may indicate transactions executed by one or more users from the certain organization. Additionally or alternatively, the profile 807 may list transactions suggested to be utilized by users of the certain organization. Optionally, the computer system may utilize collaborative filtering to suggest additional transactions that may be utilized by users of the certain organization.

There are several ways in which the transaction recommender 806 can utilize the profiles of the users and the profile 807 of the certain user in order to select the certain transaction 808. One approach that may be used by the transaction recommender 806 is to find profiles among the profiles of the users that are similar to the profile 807, and to select the certain transaction 808 based on transactions indicated by the similar profiles. In one example, if a profile of a user that is similar to the profile 807 lists transactions executed by the user, then the certain transaction 808 may be one of the listed transactions. In another example, if a profile of a user that is similar to the profile 807 lists templates utilized by the user, then the certain transaction 808 may be a transactions executed when running an instantiation of one of the listed templates.

In one example, the transaction recommender 806 identifies transactions that are indicated in at least one profile of a user that is similar to the profile 807. From amongst the transactions, the transaction recommender 806 may select the certain transaction 808 based on the number of different users that executed the transactions. For example, the certain transaction 808 may be a transaction that is indicated as executed in at least one profile of a user that is similar to the profile 807 and is a transaction that was executed by a largest number of users. That is, there is no other transaction that was executed by a larger number of users which is also indicated as executed in a profile that is similar to the profile 807. Optionally, the fact that the certain transaction 808 was executed by many users is indicative of the fact that it is likely to be a transaction that may be utilized by the certain user.

In another example, the transaction recommender 806 identifies transactions that are indicated in at least one profile of a user that is similar to the profile 807; from amongst the transactions, the transaction recommender 806 may select the certain transaction 808 based on the number of different organizations that have users that executed the transactions. For example, the certain transaction 808 may be a transaction that is indicated as executed in at least one profile of a user that is similar to the profile 807 and is a transaction that was executed by users belonging to a largest number of organizations. That is, there is no other transaction that was executed by the users belonging to a larger number of organizations, which is also indicated as executed in a profile that is similar to the profile 807. Optionally, the fact that the certain transaction 808 was executed by users belonging to many organizations is indicative of the fact that it is likely to be a transaction that may be utilized by the certain user.

In yet another example, the transaction recommender 806 identifies profiles of users that are similar to the profile 807 of the certain user. For example, the profiles are embedded in a metric space, and the transaction recommender 806 finds profiles that are closest to the profile 807 in the metric space. From one or more profiles closest to the profile of the certain user, the transaction recommender 806 selects the certain transaction 808. Optionally, the certain transaction 808 has not been executed by the certain user (as indicated by the profile 807). Optionally, the certain transaction 808 is indicated as utilized in a profile that is most similar to the profile 807.

In one embodiment, the transaction recommender 806 utilizes a collaborative filtering algorithm, such as a memory-based algorithm, a model-based algorithm, or a hybrid approach. Optionally, the collaborative filtering algorithm selects the certain transaction 808 based on one or more profiles found by the collaborative filtering algorithm to be similar to the profile 807 of the certain user. Optionally, recommendations of the collaborative filtering algorithm are filtered to exclude transaction that have already been executed by the certain user.

In one embodiment, the transaction recommender 806 may select the certain transaction 808 by providing an identifier of the certain transaction 808 (e.g., a transaction identification number). Alternatively or additionally, selecting the certain transaction 808 is done by the transaction recommender 806 by providing one or more test scenarios and/or templates that involve the certain transaction 808. Optionally, the one or more test scenarios and/or templates may be used to test execution of the certain transaction.

In one embodiment, the computer system optionally includes a template generator 810, which is configured to generate a test scenario template that involves execution of the certain transaction 808. Optionally, the template generator 810 is configured to generate the test scenario template based on transactions executed by one or more users with similar profiles to the profile of the certain user. For example, the template may include several transactions that appear in a profile of a user that is similar to the profile 807.

The computer system may also optionally include a customization module 812 that is configured to customize the test scenario template for the certain user by adding to the test scenario template proprietary data relevant to the certain user. Optionally, at least some of the proprietary data is obtained from the profile 807. Additionally, the computer system may optionally include a user interface 813 configured to suggest to the certain user to run an instantiation of the test scenario template.

Figure 2:
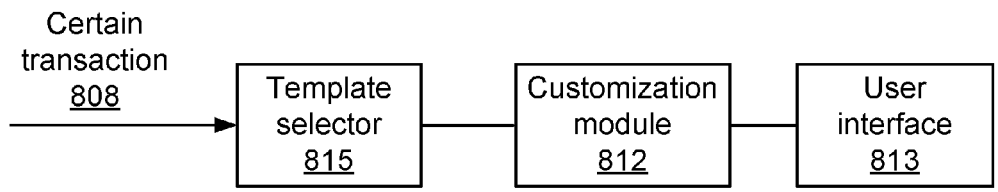
FIG. 2 illustrates one embodiment in which a transaction is provided to a template selector.

FIG. 2 illustrates one embodiment in which the certain transaction 808 is provided to a template selector 815. Optionally, the template selector is configured to select a test scenario template that involves execution of the certain transaction 808. Optionally, the test scenario template may be used to test whether the certain transaction 808 is executed correctly on a software system. Optionally, the test scenario template may be customized by the customization module 812 for the certain user by adding to the test scenario template proprietary data relevant to the certain user. Optionally, at least some of the proprietary data is obtained from the profile 807. Additionally, the template may be suggested to the certain user via the user interface 813.

In one embodiment, the computer system optionally includes the monitoring module 801 which is configured to monitor activity of the users 800. Optionally, the users 800 are running test scenarios on the software systems of the different organizations. Optionally, the monitoring module 801 is configured to provide data obtained from the activity data 802 to the transaction identifier 804.

It is to be noted that different embodiments may implement components of the computer system illustrated in FIG. 1 and/or FIG. 2 in different ways. For example, in some embodiments one or more of the following may be implemented by the same software module and/or software modules running on the same processor: the monitoring module 801, the transaction identifier 804, the profile generator 805, the transaction recommender 806, the template generator 810, the template selector 815, the customization module 812, and the user interface 813. Additionally, one or more of the aforementioned components may be implemented on a remote server, such as a cloud-based server.

Figure 3:
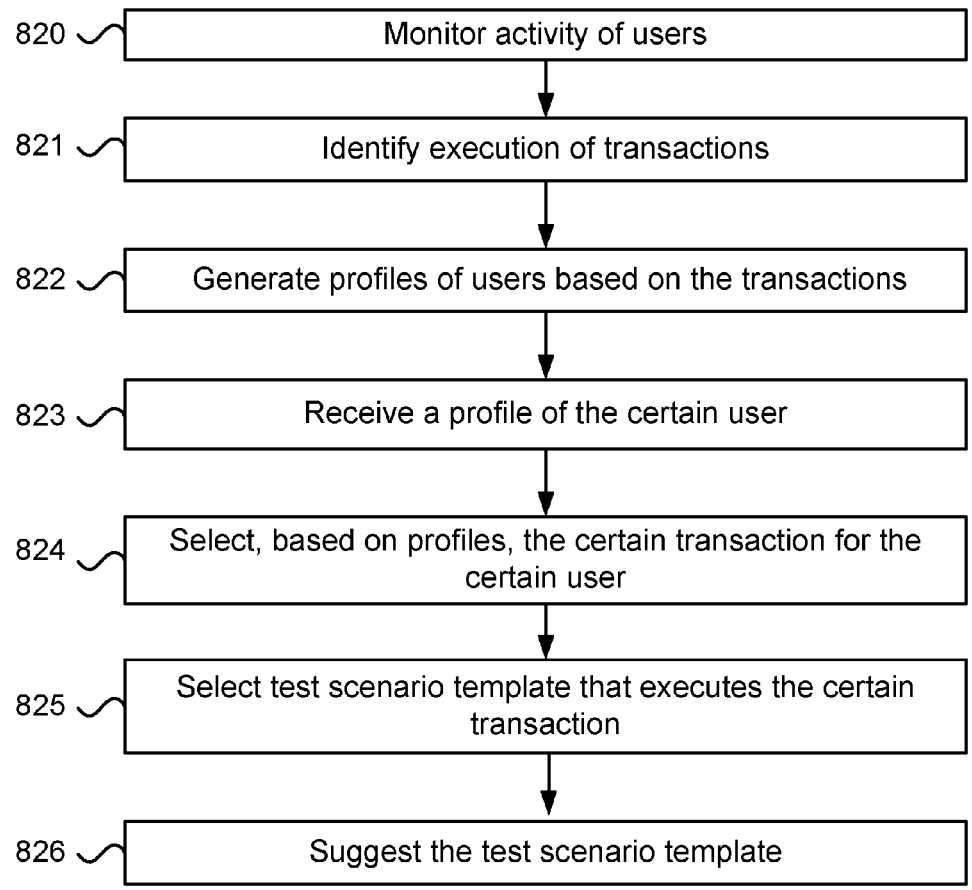
FIG. 3 illustrates one embodiment of a computer implemented method for selecting a transaction for a certain user based on similarity of a profile of the certain user to profiles of users belonging to different organizations.

FIG. 3 illustrates one embodiment of a computer implemented method for selecting a transaction for a certain user based on similarity of a profile of the certain user to profiles of users belonging to different organizations. The illustrated embodiment includes the following steps:

In step 821, receiving activity data obtained by monitoring activity of the users on software systems belonging to the different organizations.

In step 822, identifying transactions executed by the users on the software systems.

In step 823, generating profiles of the users based on the transactions; a profile of a user indicates transactions executed by the user.

In step 824, receiving a profile of the certain user; the certain user belongs to a certain organization that is not one of the different organizations. The profile of the certain user indicates transactions executed by the certain user on a software system belonging to the certain organization.

And in step 825 selecting, based on similarity of at least some of the profiles of the users to the profile of the certain user, a certain transaction. The certain transaction is a transaction that was executed by a user with a similar profile to the profile of the certain user. Optionally, the certain transaction was not executed by the certain user. Optionally, the certain transaction was not executed by a user belonging to the certain organization. Optionally, the certain transaction was executed by a user with a profile that is most similar, amongst the profiles of the users, to the profile of the certain user.

In one embodiment, selecting the certain transaction in step 825 is based on the number of different users that executed the transactions. For example, the certain transaction may be a transaction that is indicated as executed in at least one profile of a user that is similar to the profile of the certain user, and is a transaction that was executed by a largest number of users.

In another embodiment, selecting the certain transaction in step 825 is based on the number of different organizations with users that executed the transactions. For example, the certain transaction may be a transaction that is indicated as executed in at least one profile of a user that is similar to the profile of the certain user, and is a transaction that was executed by users belonging to a largest number of organizations.

In one embodiment, the computer method optionally includes step 820 that involves monitoring the activity of the users belonging to the different organizations and providing the activity data for the identifying of the transactions.

In one embodiment, the computer method illustrated in FIG. 3 optionally includes a step involving generating a test scenario template based on the certain transaction. Additionally, the computer method may optionally include a step involving generating the test scenario template based on transactions executed by one or more users with similar profiles to the profile of the certain user. Additionally, the computer method may optionally include a step involving customizing the test scenario template for the certain user by adding to the test scenario template proprietary data relevant to the certain user.

In one embodiment, the computer method optionally includes step 826 which involves selecting a test scenario template that involves execution of the certain transaction. Additionally, the computer method may optionally include step 827, which involves suggesting to the certain user to run an instantiation of the test scenario template.

In one embodiment, a non-transitory computer-readable medium stores program code that may be used by a computer to select a transaction for a certain user based on similarity of a profile of the certain user to profiles of users belonging to different organizations. The computer includes a processor, and the non-transitory computer-readable medium stores the following program code:

Program code for receiving activity data obtained by monitoring activity of the users on software systems belonging to the different organizations.

Program code for identifying transactions executed by the users on the software systems.

Program code for generating profiles of the users based on the transactions; a profile of a user indicates transactions executed by the user.

Program code for receiving a profile of the certain user; the certain user belongs to a certain organization that is not one of the different organizations. The profile of the certain user indicates transactions executed by the certain user on a software system belonging to the certain organization.

And program code for selecting, based on similarity of at least some of the profiles of the users to the profile of the certain user, a certain transaction; the certain transaction was executed by a user with a similar profile to the profile of the certain user. Optionally, the certain transaction was not executed by the certain user. Optionally, the certain transaction was not executed by a user belonging to the certain organization.

In one embodiment, the non-transitory computer-readable medium optionally stores program code for selecting the certain transaction based on number of different users that executed the transactions.

In one embodiment, the non-transitory computer-readable medium optionally stores program code for selecting the certain transaction based on number of different organizations with users that executed the transactions.

wherein the certain transaction was executed by a user with a profile that is most similar, amongst the profiles of the users, to the profile of the certain user.

In one embodiment, the non-transitory computer-readable medium optionally stores program code for monitoring the activity of the users belonging to the different organizations and providing the activity data for the identifying of the transactions.

In one embodiment, the non-transitory computer-readable medium optionally stores program code for generating a test scenario template based on the certain transaction. Additionally, the non-transitory computer-readable medium may optionally store program code for generating the test scenario template based on transactions executed by one or more users with similar profiles to the profile of the certain user. Additionally, the non-transitory computer-readable medium may optionally store program code for customizing the test scenario template for the certain user by adding to the test scenario template proprietary data relevant to the certain user.

In one embodiment, the non-transitory computer-readable medium optionally stores program code for selecting a test scenario template that comprises execution of the certain transaction. Additionally, the non-transitory computer-readable medium may optionally store program code for suggesting to the certain user to run an instantiation of the test scenario template.

Figure 4:
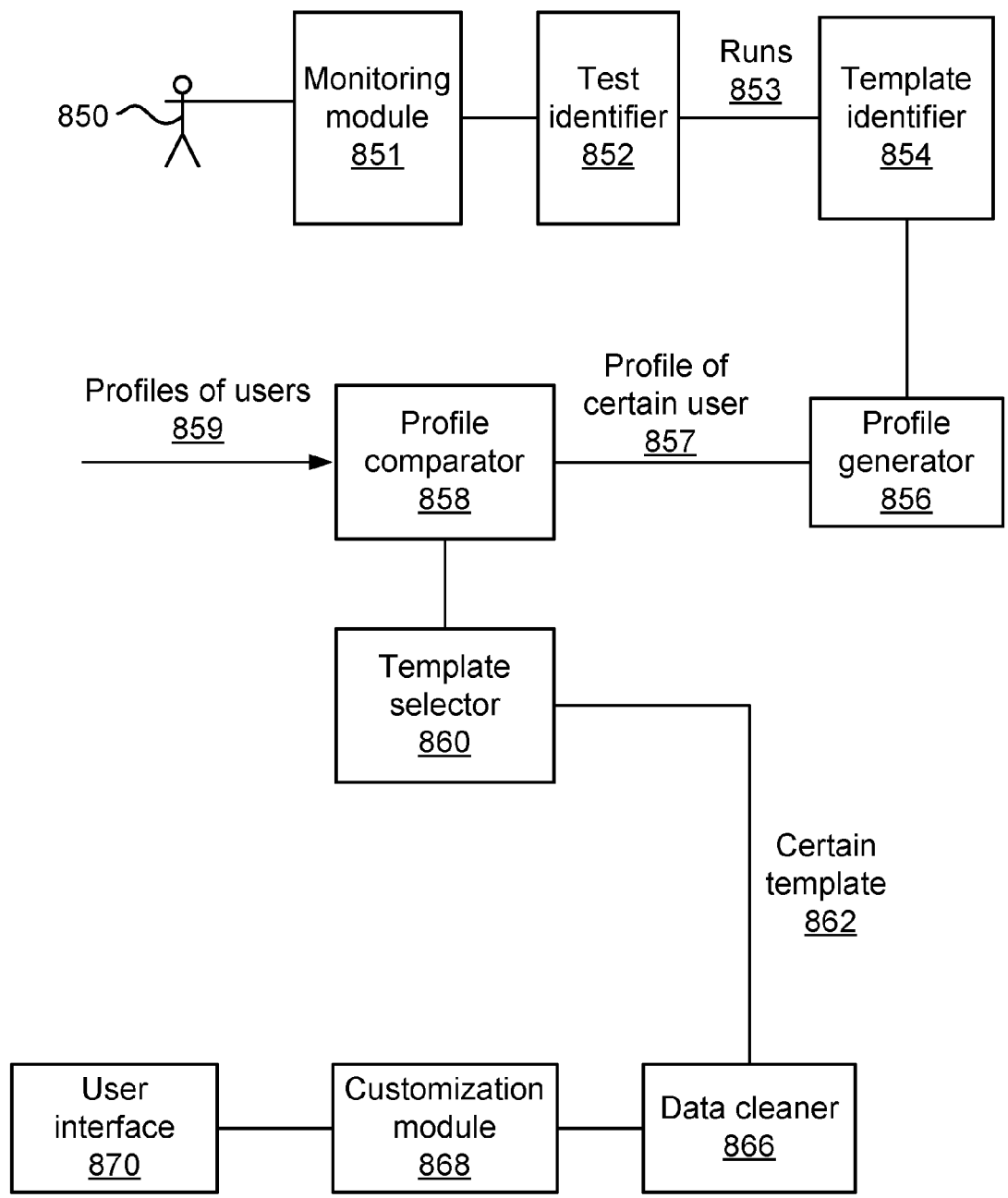
FIG. 4 illustrates one embodiment of a computer system configured to select a test scenario template for a certain user based on similarity of a profile of template utilization by the certain user to profiles of template utilization by other users.
Figure 5:
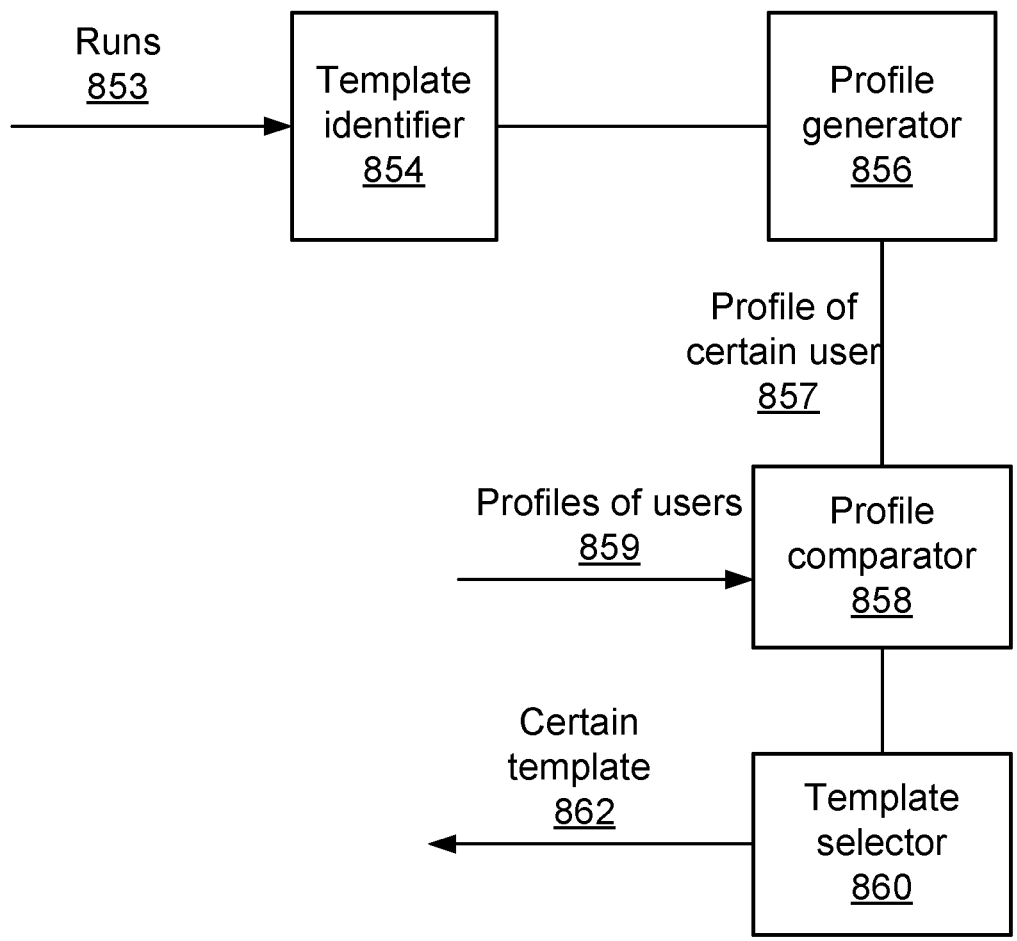
FIG. 5 illustrates one embodiment of a computer system configured to select a test scenario template for a certain user based on similarity of a profile of template utilization by the certain user to profiles of template utilization by other users.

FIG. 4 and FIG. 5 illustrate embodiments of a computer system configured to select a test scenario template for a certain user based on similarity of a profile of template utilization by the certain user to profiles of template utilization by other users. The illustrated embodiments include at least a template identifier 854, a profile generator 856, a profile comparator 858, and a template selector 860.

The template identifier 854 is configured to receive runs of test scenarios, run by a certain user belonging to a certain organization on a software system belonging to the certain organization. The template identifier 854 is also configured to identify, from the runs, test scenario templates utilized by the certain user. Optionally, a template may be considered utilized by a user if the user runs an instantiation of the template. For example, if the certain user ran an instantiation of a template on the software system belonging to the certain organization, the template may be considered to be utilized by the certain user. Optionally, the runs of the test scenarios may include scripts and/or commands from which the template identifier 854 may determine templates that correspond to the runs.

In one embodiment, the runs of the test scenarios include information that indicates for each run of a test scenario a template from which the test scenario was instantiated. For example, the run may include an identifier of the template and/or code corresponding to the template. The template identifier 854 utilizes the information to identify the templates utilizes by the certain user. For example, each template indicated in a run as being a template from which the run was instantiated is considered by the template identifier 854 to be a template utilized by the certain user.

In another embodiment, the runs of the test scenarios are associated with clusters of runs of test scenarios. For example, the runs that may be assigned to the clusters (e.g., by a clustering algorithm or by a classifier). Optionally, each of the clusters may be represented by at least one test scenario template. Thus, the test identifier 852 may utilize the cluster associations, along with identifications of templates that represent the clusters, in order to identify the templates utilized by the certain user. For example, a template utilized by the certain user may be a template representing a cluster to which a run of the certain user belongs.

In yet another embodiment, the runs of the test scenarios may be compared to various templates in order to identify templates that are similar to the runs. The test identifier 852 may utilize information regarding similarity of templates to runs in order to identify the templates utilized by the certain user. For example, the test identifier 852 may consider a template that has similarity to a run that exceeds a predetermined threshold to be utilized by the certain user. Optionally, in order to compare a run and template, the run is compared to another run instantiated from the template. Optionally, comparing a run to a template takes into account similar data in the run and the template. For example, a comparison between a run and a template may take into account field names that appeared in screens in the run and screens in the template, but the comparison may ignore user input that is recorded in the run which may not be part of the template.

The profile generator 856 is configured to generate a profile 857 of the certain user based on the test scenario templates. The profile 857 includes indications of test scenario templates utilized by the certain user. Thus, the profile 857 may be considered a profile of utilization of templates. Optionally, indications of the templates utilized by the certain user may be direct indications. For example, the profile 857 includes identifiers of templates and/or the templates themselves (e.g., code of the templates). Optionally, the indications of the templates utilized by the certain user may be indirect indications. For example, the profile may list runs of test scenarios instantiated from the templates.

The profile comparator 858 is configured to receive the profile 857 of the certain user and profiles 859 of users belonging to different organizations. Optionally, the certain organization is not one of the different organizations. Optionally, the profiles indications of test scenario templates utilized by the users. Optionally, the indications may be direct indications and/or indirect indications.

In one embodiment, the template identifier 854 may be utilized to identify templates from runs of test scenarios run by the users belonging to the different organizations on software systems belonging to the different organizations. Optionally, the runs of test scenarios may be included in the profiles 859. Additionally or alternatively, the profile generator 856 may be utilized, at least in part, to generate the profiles 859 of the users.

The profile comparator 858 is also configured to compare between the profile 857 of the certain user and the profiles 859 of the users, and to identify at least one profile of a user, from among the profiles 859, which is similar to the profile 857.

In some embodiments, determining whether two profiles are similar and/or degree of similarity of the two profiles requires comparison of templates belonging to each of the two profiles. The comparison may identify pairs of templates that are identical in the two profiles (e.g., a first template from a first profile that is identical to a second template from a second profile). Additionally, the comparison may involve identifying pairs of templates that are similar from the two profiles, and/or degree of similarity of pairs of templates from the two profiles. Determining identity and/or similarity of pairs of templates may be done in various ways.

In one example, two test scenario templates may be considered identical if they are identified by a same identifier (e.g., template identification number), contain the same code, involve the same screens, are based on the same script, are generated from the same runs of test scenarios and/or involve execution of the same transactions.

In one example, two test scenario templates may be considered similar if they involve similar elements. For example, the two templates contain similar elements such as similar code (e.g., they share a certain portion of code, but other portions are different), similar screens (e.g., screens that have some of the same fields), and/or involve execution of at least some of the same transactions. Optionally, similarity of two templates is computed by comparing elements in each template. For example, similarity of two templates is computed according to the number and/or portion of similar transactions in each of the two templates. Optionally, if a number and/or portion of elements that are similar in two templates reaches a predetermined threshold, the two templates are considered similar, otherwise, they are not considered similar.

In another example, two templates that are generated from one or more same runs of test scenarios are considered similar. Optionally, two templates that are generated from one or more runs from a same cluster of similar runs are considered similar. Optionally, two templates that instantiate test scenarios that produce runs of test scenarios that are considered similar, are considered similar templates.

In one example, templates are represented by vectors, and determining similarity of templates may utilize similarity functions that may be used with vectors (e.g., dot-product, Pearson correlation). Optionally, if a similarity value returned by a function computing similarity of two vectors that represent two templates reaches a predetermined threshold, the two templates are considered similar; otherwise, the two templates are not considered similar.

The comparison of the profile 857 of the certain user and the profiles 859 of the users profile may be done in various ways. Optionally, the profiles may be represented in various ways. For example, a vector representation may be used (e.g., representing which templates were utilized), or a profile may contain a collection and/or listing of utilized templates.

In one embodiment, a comparison of profiles involves identifying which templates in the profiles are identical and/or similar. Optionally, if the number of identical and/or similar templates reaches a predetermined threshold, the profiles may be considered identical and/or similar. Similarly, if the portion of templates that are similar and/or identical reaches a predetermined threshold the profiles may be considered similar and/or identical. Optionally, the decision on whether the profiles are similar or identical may be determined according to the number and/or portion of templates that are similar and/or identical. For example, if the number of templates that are identical in the profiles reaches a first predetermined threshold, the profiles are considered similar; however, if the number reaches a second predetermined threshold that is higher than the first, the profiles may be considered identical. Optionally, a degree of similarity between the profiles is determined based on the number and/or portion of templates that are similar and/or identical in the profiles. For example, the larger the number portion of similar templates in the profiles, the more similar they are considered.

In another embodiment, the profiles 859 of the users and the profile 857 of the certain user are converted to vectors. For example, each profile may be converted to a binary vector where each position in the vector corresponds to a different template. A vector of a profile may have 1 in a certain position that corresponds to a template if the profile indicates that the user to whom the profile corresponds utilized the template; otherwise, the vector may be 0 at the certain position. Given a vector representation, the profile comparator 858 may utilize various approaches to find profiles of users that are similar to the profile 857. In one example, the profile comparator 858 may perform pairwise comparisons and utilize a similarity metric such as a dot-product or Pearson correlation. In another example, the profile comparator 858 may utilize nearest neighbor searching or locality-sensitive hashing to find a vector representing a profile of a user that is similar to the vector representing the profile 857.

In yet another embodiment, the profile comparator 858 compares the profile 857 of the certain user to thee profiles 859 of the users by identifying pairs of similar and/or identical templates in profiles being compared. For example, when comparing the profile 857 to a profile of a user, the comparator 858 may form pairs of similar templates by examining each template indicated as utilized in the profile 857 and pairing it with a most similar template indicated as utilized in the profile of the user that could be found. The similarity of the profile 857 to the profile of the user may be determined according to the pairs of similar templates that were found and the corresponding similarity levels of the pairs. For example, the similarity may be proportional to the number and/or proportion of the pairs of similar templates that have a corresponding similarity that exceeds a predetermined threshold.

The template selector 860 is configured to select a certain template 862 that is appropriate for the certain user. The certain template 862 is selected from among candidate templates which are templates indicated as utilized in the at least one profile of a user identified by the profile comparator 858 as being similar to the profile 857 of the certain user. Optionally, at least some of the candidate templates were generated from runs of test scenarios run by the users belonging to the different organizations. In one example, the runs of test scenarios of the users were clustered into clusters of similar runs. In this example, at least some of the candidate templates were generated from runs belonging to the clusters and/or may represent the clusters. Optionally, the profile 857 does not include an indication that the certain user utilized the certain template 862; thus, the certain template 862 may be a new template to the certain user. Optionally, the certain template 862 is utilized by at least two different users belonging to two different organizations of the different organizations.

There are various approaches that may be utilized by the template selector 860 to select the certain template 862 from among the candidate templates. Optionally, the template selector may take into consideration factors such as degree of utilization of the candidate templates by the users and/or the different organizations. Additionally or alternatively, the template selector 860 may take into account similarity of the candidate templates to templates utilized by the certain user.

In one embodiment, selecting the certain template 862, from among templates that are indicated as utilized in the at least one profile (i.e., the candidate templates), is based on the number of different users that utilized the templates. For example, the certain template 862 may be one of the candidate templates that was utilized by a large number of users (from among all the users with profiles). In this example, utilization of a template by a large number of users may indicate a general popularity of the template, and thus it may also be useful for the certain user. In another example, the certain template 862 may be one of the candidate templates that was utilized by a large number of users with similar profiles to the profile 857 of the certain user. In this example, utilization of a template by a large number of users with similar profiles to the profile 857 may indicate that the template is popular with users that are similar to the certain user and is thus likely to be more suitable for the certain user than another template that is only utilized by a small number of users that are similar to the certain user. Optionally, a large number of users is a number of users that places the template in the upper half of templates when ranking them according to the number of users that utilized them. Alternatively, a large number of users is a number of users that may place the template in the top of a list of templates ranked according to the number of users that utilized them.

In another embodiment, selecting the certain template 862, from among the candidate templates is based on the number of different organizations with users that utilized the templates. For example, the certain template 862 may be one of the candidate templates that was utilized by users coming from the largest number of different organizations. In this example, utilization of a template by users coming from a large number of organizations indicates a general popularity of the template across organizations; thus, the template may be more likely to be useful for the certain organization to which the certain user belongs. In another example, the certain template 862 may be one of the candidate templates that was utilized by users with similar profiles to the profile 857, which come from a large number of organizations. In this example, utilization of a template by users with similar profiles from a large number of organizations may indicate that the template is popular with organizations that may be similar to the certain organization (since they all have users that belong to them that have similar profiles); thus, the template is likely to be more suitable for the certain user (and the certain organization) than another template that is only utilized by users with similar profiles to the profile 857, that belong to a small number of organizations. Optionally, a large number of organizations is a number of organizations that places the template in the upper half of templates when ranking them according to the number of organizations that have users belong to them that utilized the templates. Alternatively, a large number of organizations is a number of organizations that may place the template in the top of a list of templates ranked according to the number of organizations that have users that utilized the templates.

In yet another embodiment, selecting the certain template 862, from among the candidate templates is based on similarity of the candidate templates to templates utilized by the certain user. In one example, the template selector 860 may select the certain template 862 to be a candidate template that has a high similarity to other templates already utilized by the certain user. This may be done in order to suggest to the certain user templates cover additional aspects, or slight variations, of elements that have already been tested by the certain user; this may enable more complete coverage of the elements. In another example, the template selector 860 may select the certain template 862 to be a candidate template that has a low similarity to other templates already utilized by the certain user. This may be done in order to suggest to the certain user templates cover new elements that have not been tested by the certain user; however, since these elements were tested by other users with similar profiles, it may be likely that the certain user should also test those elements.

In one embodiment, the comparisons of the profile 857 of the certain user to the profiles of the users are performed by a collaborative filtering algorithm which is utilized by the profile comparator 858. Alternatively or additionally, selection of the certain template is performed by a collaborative filtering algorithm which is utilized by the template selector 860. Alternatively or additionally, the profile comparator 858 and/or the template selector 860 may be modules utilized by a collaborative filtering algorithm to perform its task. For example, the collaborative filtering algorithm may utilize the profile comparator to identify one or more profiles of users that are similar to the profile 857. The collaborative filtering algorithm may also utilize the template selector 860 to select the certain template 862. Optionally, both the profile comparator 858 and the template selector 860 are realized by the same module, that is capable of both identifying the similar profiles and selecting the certain template 862.

In one embodiment, the computer system optionally includes a customization module 868 that is configured to customize the test scenario template for the certain user by adding to the test scenario template proprietary data relevant to the certain user.

In one embodiment, the computer system optionally includes a user interface 870 that is configured to suggest to the certain user to run an instantiation of the certain template 862. Additionally or alternatively, the user interface 870 may be configured to indicate that no template is selected for the certain user if at least one of the following occurs: no profile from among the profiles of the users is identified as similar to the profile of the certain user, and no template is identified which is both appropriate for the certain user and the profile of the certain user does not comprise an indication that the template was utilized by the certain user.

In one embodiment, the computer system optionally includes a data cleaner 866 configured to remove proprietary data from the certain template 862.

In one embodiment, the computer system optionally includes a test identifier 852 configured to receive data obtained from monitoring the certain user 850 running test scenarios on a software system that belongs to certain organization and to identify the runs of test scenarios from the data. Optionally, the test identifier 852 is also configured to identify runs of test scenarios run by the users on software systems that belong to the different organizations.

In one embodiment, the computer system may optionally include a monitoring module 851 configured to monitor the certain user 850 running the test scenarios on the software system that belongs to the certain organization. Optionally, the monitoring module 851 is also configured to monitor the users belonging to the different organizations, running the test scenarios on the software systems that belong to the different organizations. Optionally, the monitoring module 851 is also configured to provide data obtained from the monitoring to the test identifier 852.

It is to be noted that different embodiments may implement components of the computer system illustrated in FIG. 4 and/or FIG. 5 in different ways. For example, in some embodiments one or more of the following may be implemented by the same software module and/or software modules running on the same processor: the monitoring module 851, the test identifier 852, the template identifier 854, the profile generator 856, the profile comparator 858, the template selector 860, the data cleaner 866, the customization module 868, and the user interface 870 Additionally, one or more of the aforementioned components may be implemented on a remote server, such as a cloud-based server. Optionally, one or more of the aforementioned modules may be part of a service which receives the runs 853 of test scenarios of the certain user, and suggest to the user a certain template 862 that may be useful for the user based on the profiles 859 of the users.

In one embodiment, the test identifier 852 and the template identifier 854 are realized by a same software module that both identifies the runs 853 and identifies the templates from which the runs 853 were instantiated. In another embodiment, the template identifier 854 and the profile generator 856, are both implemented, at least in part by a same software module that both identifies templates from which the runs 853 were instantiated, and generates the profile 857 of the certain user.

Figure 6:
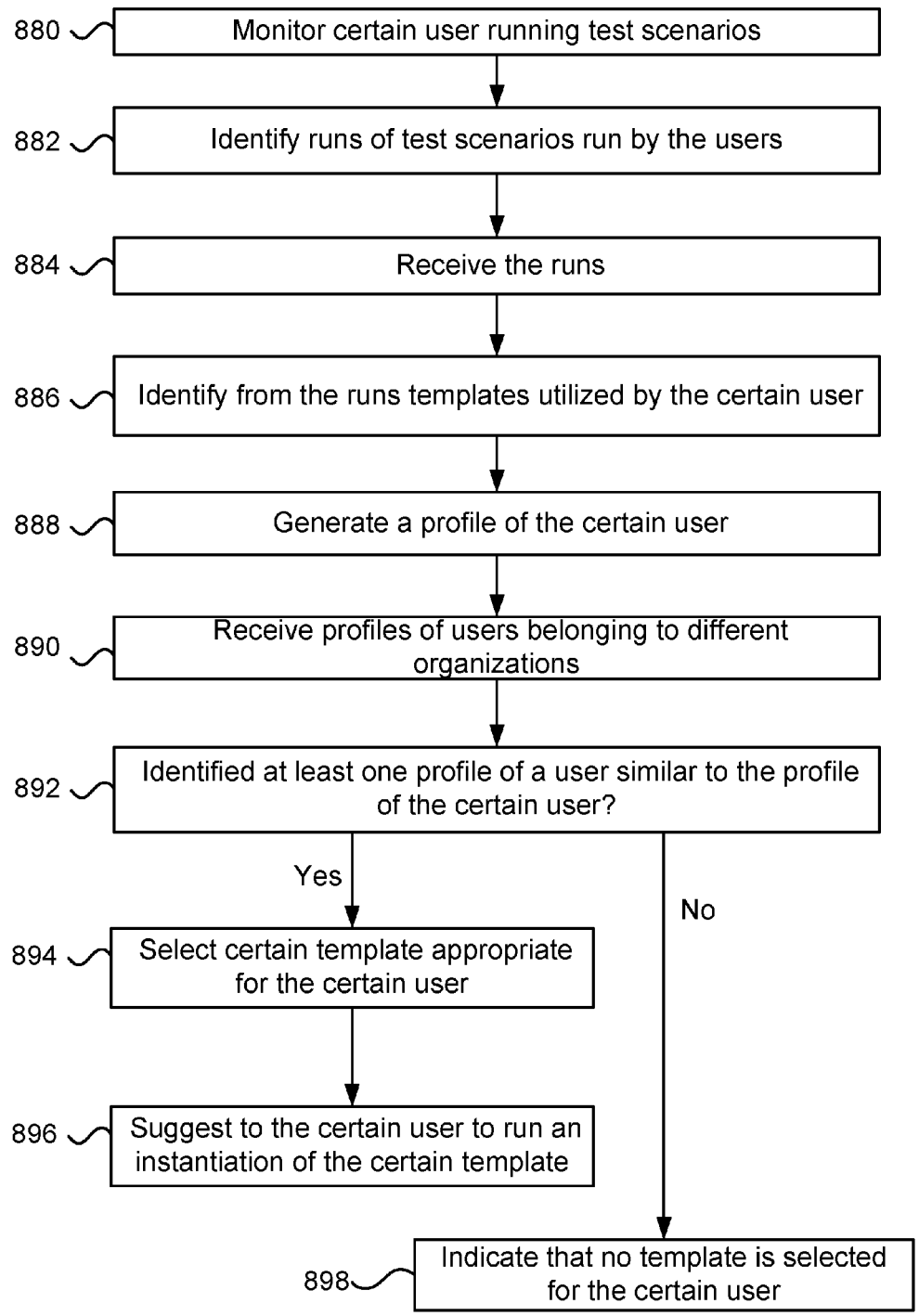
FIG. 6 illustrates one embodiment of a computer implemented method for selecting a test scenario template for a certain user based on similarity of a profile of template utilization by the certain user to profiles of template utilization by other users.

FIG. 6 illustrates one embodiment of a computer implemented method for selecting a test scenario template for a certain user based on similarity of a profile of template utilization by the certain user to profiles of template utilization by other users. The illustrated embodiment includes the following steps:

In step 884, receiving runs of test scenarios, run by a certain user belonging to a certain organization on a software system belonging to the certain organization.

In step 886, identifying, from the runs, test scenario templates utilized by the certain user. Optionally, a template may be considered utilized by a user if the user runs an instantiation of the template.

In step 888, generating a profile of the certain user based on the test scenario templates. The profile indicates test scenario templates utilized by the certain user.

In step 890, receiving profiles of users belonging to different organizations. The certain organization is not one of the different organizations, and the profiles indicate test scenario templates utilized by the users belonging to the different organizations.

In step 892, comparing between the profile of the certain user and the profiles of the users and identifying at least one profile of a user, from among the profiles of the users, which is similar to the profile of the certain user.

In step 894, following the "Yes" branch from step 892, selecting a certain template from among templates indicated as utilized in the at least one profile. Optionally, the profile of the certain user does not include an indication that the certain user utilized the certain template. Optionally, the certain template is utilized by at least two different users belonging to two different organizations of the different organizations.

In one embodiment, the computer implemented method may include optional step 896 which involves suggesting to the certain user to run an instantiation of the certain test scenario template.

In one embodiment, selecting the certain template, from among templates that are indicated as utilized in the at least one profile, may be based on the number of different users that utilized the templates. For example, the certain template may be a template utilized by the largest number of users. Additionally or alternatively, selecting the certain template, from among templates that are indicated as utilized in the at least one profile, may be based on the number of different organizations with users that utilized the templates. For example, the certain template may be a template utilized by the users belonging to the largest number of organizations.

In some embodiments, the computer implemented method may include optional step 898, which follows the "No" branch from step 892, and involves indicating that no template is selected for the certain user if at least one of the following occurs: no profile from among the profiles of the users is identified as similar to the profile of the certain user, and no template is identified which is both appropriate for the certain user and the profile of the certain user does not comprise an indication that the template was utilized by the certain user.

In one embodiment, the computer implemented method includes optional step 880 which involves monitoring the certain user running the test scenarios on the software system that belongs to the certain organization. Additionally or alternatively, the computer implemented method may include optional step 882 which involves identifying the runs of test scenarios run by the certain user on a software system that belongs to the certain organization from data obtained from monitoring the certain user. Optionally, the runs are identified from data obtained by the monitoring.

In one embodiment, the computer implemented method illustrated in FIG. 6 includes an optional step of customizing the certain template for the certain user by adding to the certain template proprietary data relevant to the certain user.

In one embodiment, a non-transitory computer-readable medium stores program code that may be used by a computer to select a test scenario template for a certain user based on similarity of a profile of template utilization by the certain user to profiles of template utilization by other users. The computer includes a processor, and the non-transitory computer-readable medium stores the following program code:

Program code for receiving runs of test scenarios, run by a certain user belonging to a certain organization on a software system belonging to the certain organization.

Program code for identifying, from the runs, test scenario templates utilized by the certain user. Optionally, a template may be considered utilized by a user if the user runs an instantiation of the template.

Program code for generating a profile of the certain user based on the test scenario templates. The profile indicates test scenario templates utilized by the certain user.

Program code for receiving and profiles of users belonging to different organizations. The certain organization is not one of the different organizations, and the profiles indicate test scenario templates utilized by the users belonging to the different organizations.

Program code for comparing between the profile of the certain user and the profiles of the users and identifying at least one profile of a user, from among the profiles of the users, which is similar to the profile of the certain user.

And program code for selecting a certain template, from among templates indicated as utilized in the at least one profile, which is appropriate for the certain user. The profile of the certain user does not comprise indication that the certain user utilized the certain template. Optionally, the certain template is utilized by at least two different users belonging to two different organizations of the different organizations.

In one embodiment, the non-transitory computer-readable medium optionally stores program code for selecting the certain template, from among templates that are indicated as utilized in the at least one profile, based on number of different users that utilized the templates.

In another embodiment, the non-transitory computer-readable medium optionally stores program code for selecting the certain template, from among templates that are indicated as utilized in the at least one profile, based on number of different organizations with users that utilized the templates.

In one embodiment, the non-transitory computer-readable medium optionally stores program code for customizing the certain template for the certain user by adding to the certain template proprietary data relevant to the certain user.

In one embodiment, the non-transitory computer-readable medium optionally stores program code for suggesting to the certain user to run an instantiation of the certain test scenario template.

In one embodiment, the non-transitory computer-readable medium optionally stores program code for removing proprietary data from the certain template.

In one embodiment, the non-transitory computer-readable medium optionally stores program code for identifying the runs of test scenarios run by the certain user on a software system that belongs to the certain organization from data obtained from monitoring the certain user.

In one embodiment, the non-transitory computer-readable medium optionally stores program code for monitoring the certain user running the test scenarios on the software system that belongs to the certain organization. Optionally, the same module of program code performs both the monitoring and the identifying of the runs of test scenarios run by the certain user.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user running test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied—permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations. Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of "age" may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user. Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

Collaborative Filtering

In one embodiment, a profile of a certain user may be indicative of transactions run by the certain user, and/or clusters containing runs of test scenarios run by the certain user that use these transactions. Thus, the profile is indicative of a usage pattern of the user (actual usage and/or expected usage). Optionally, in order to suggest additional test scenarios, test scenario templates, and/or clusters for the user, collaborative filtering methods, which rely on usage patterns of other users, may be used.

Collaborative filtering is an algorithmic approach generally used for making automatic predictions (filtering) about the interests of a user by collecting preferences or taste information from many users (collaborating). For example, by detecting similarities between the profile of the certain user and profiles other users, it may be possible to suggest to the certain user a template that was utilized by the other users, but has not yet been utilized by the certain user. The underlying assumption is that since the certain user and the other users utilized some of the same templates (as evident from the similarity of their respective profiles), it is likely that a template that was utilized by the other users may be useful for the certain user.

There are many algorithmic collaborative filtering approaches that may be utilized by those skilled in the art to make recommendations for a user based on similarities of a profile of a certain user to profiles of other users. For example, memory-based methods may be used to select a profile similar to the profile of the certain user, such as using nearest-neighbor searches. In another example, model based algorithms may rely on the profiles of the other users to generate a model of test scenarios, templates, and/or clusters suitable for the certain user. The model generation may utilize many algorithmic approaches such as Bayesian networks, latent semantic models, singular value decomposition (and/or other forms of matrix factorization), and/or clustering. In still another example, a combination of the memory-based and the model-based collaborative filtering algorithms may be used. In some cases, a hybrid approach that combines memory-based and model-based approaches may help overcome shortcomings of the individual approaches.

In one embodiment, a first profile of a first user is considered similar to a second profile of a second user if the first and second profiles indicate that both profiles have a certain number of transactions, clusters, and/or templates in common, and the certain number reaches a predetermined threshold. Additionally or alternatively, the first and second profile may be considered similar if the first and second profiles have a certain proportion of transactions, clusters, and/or templates in common, and the certain proportion reaches a predetermined threshold.

In another embodiment, a first profile of a first user is considered similar to a second profile of a second user if a similarity function applied to vector representations of the first and the second profiles indicates that the similarity between the vectors reaches a predetermined threshold. For example, the similarity function may compute the angle (dot product) between the vectors, and if the cosine of the angle is larger than a certain predetermined threshold, the profiles may be considered similar. In another example, the Pearson correlation may be used to determine the similarity of two vectors. In yet another example, similarity between binary vectors representing profiles may be determined according to the Hamming distance of the vectors (e.g., if the hamming distance is below a predetermined threshold, the profiles are considered similar).

In one embodiment, profiles utilized by a collaborative filtering algorithm to suggest templates for a certain user to utilize come from users belonging to organizations that are different from an organization to which the certain user belongs. Often, this can help suggest to the certain user test scenario templates that may be useful for the certain user, but are however unknown or not typically utilized within the organization of the certain user. This may help increase the scope, coverage, and/or diversity of aspects that are tested by runs of test scenarios of the user, which can increase the efficiency of test scenarios, possibly reducing the number of test scenarios that need to be run.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to running a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 7A to FIG. 7G illustrate some, but not all, combinations of system modules that may be used in embodiments described in this disclosure to process the template and/or suggest the template to a user.

Figure 7A:
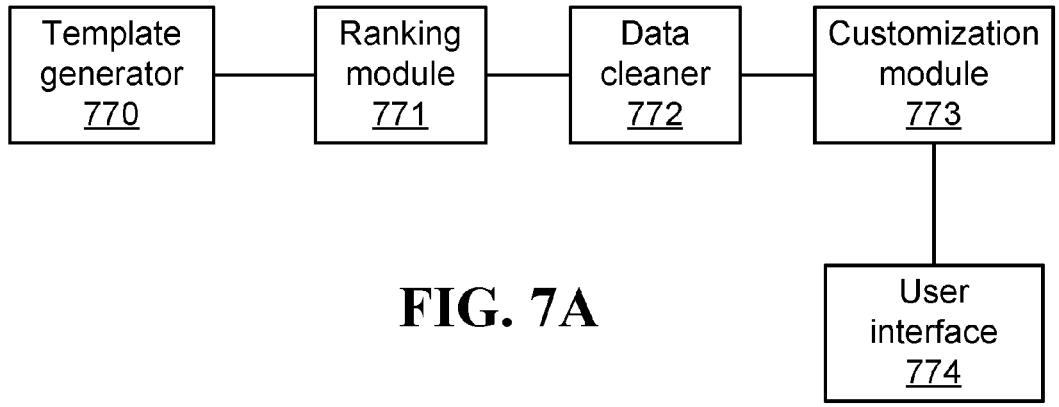
FIG. 7A illustrates a combination of system modules that may be used in embodiments described in this disclosure.

FIG. 7A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 7B:
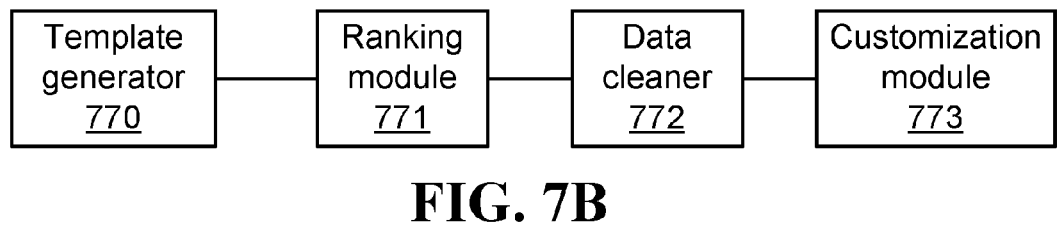
FIG. 7B illustrates a combination of system modules that may be used in embodiments described in this disclosure.

In other embodiments, after being processed by various modules, a template generated by the template generator need not be provided to a user interface. For example, it may be stored in the system for further use. FIG. 7B illustrates a similar portion of a system to the system illustrated in FIG. 7A, however in this system after being subjected to ranking, removal of proprietary data, and customization, a template is not presented to a user via a user interface.

Figure 7C:
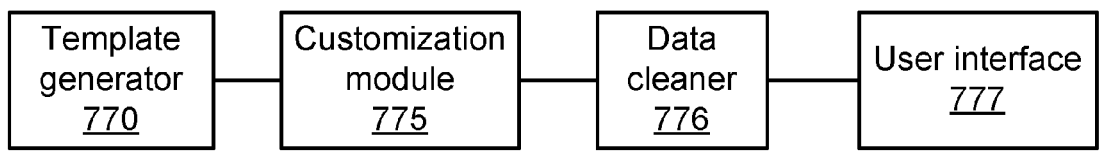
FIG. 7C illustrates a combination of system modules that may be used in embodiments described in this disclosure.
Figure 7D:
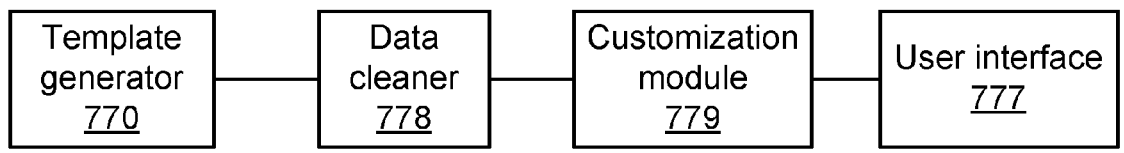
FIG. 7D illustrates a combination of system modules that may be used in embodiments described in this disclosure.

The order in which a template may undergo processing by system modules may differ between embodiments. For example, FIG. 7C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 7D illustrates a similar system, however in it a template generated by the template generator 770 is first provided to a data cleaner 778. After removing proprietary data from the template, the template is provided to a customization module 779. The customized template may then be presented to a user via the user interface 777.

Figure 7E:
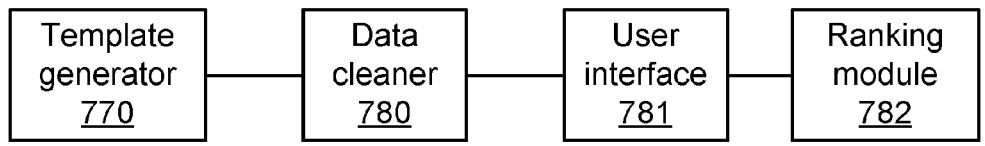
FIG. 7E illustrates a combination of system modules that may be used in embodiments described in this disclosure.
Figure 7F:
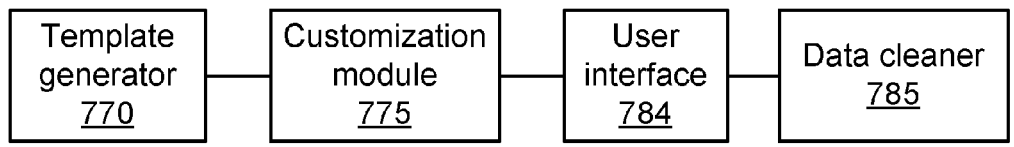
FIG. 7F illustrates a combination of system modules that may be used in embodiments described in this disclosure.

In some embodiments, a user interface is not necessarily used to suggest templates to a user; it may be utilized by other system modules to perform their task. FIG. 7E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 7F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 7G:
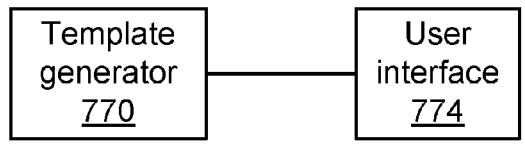
FIG. 7G illustrates a combination of system modules that may be used in embodiments described in this disclosure.

In some embodiments, a template that is generated by a template generator does not undergo additional processing by system modules. For example, as illustrated in FIG. 7G, after being generated by the template generator 770, the template may be sent to the user interface 774 (e.g., to be suggested to a user).

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers.

The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system configured to select a test scenario template for a certain user based on similarity of a profile of template utilization by the certain user to profiles of template utilization by other users, comprising:
   at least one processor and memory; the at least one processor and the memory cooperating to function as:
   a template identifier configured to receive runs of test scenarios, run by the certain user on a software system belonging to a certain organization;
   the template identifier further configured to identify, from the runs, test scenario templates utilized by the certain user; wherein the certain user utilizes a template by running an instantiation of the template;
   a profile generator configured to generate a profile of the certain user; wherein the profile comprises indications of test scenario templates utilized by the certain user;
   a profile comparator configured to receive the profile of the certain user and profiles of users belonging to different organizations; wherein the certain organization is not one of the different organizations, and the profiles comprise indications of test scenario templates utilized by the users;
   the profile comparator is further configured compare between the profile of the certain user and the profiles of the users, and to identify at least one profile of a user, from among the profiles of the users, for which the number of test scenario templates indicated as utilized by the user, which are also indicated in the profile of the certain user as utilized by the certain user, reaches a predetermined threshold; and
   a template selector configured to select a certain template from among templates indicated as utilized in the at least one profile; wherein the profile of the certain user does not comprise indication that the certain user utilized the certain template.

2. The computer system of claim 1, wherein the template selector is further configured to select the certain template, from among templates that are indicated as utilized in the at least one profile, based on number of different users that utilized the templates.

3. The computer system of claim 1, wherein the template selector is further configured to select the certain template, from among templates that are indicated as utilized in the at least one profile, based on number of different organizations with users that utilized the templates.

4. The computer system of claim 1, wherein the at least one processor and the memory further cooperate to function as a customization module configured to customize the certain template for the certain user by adding to the certain template proprietary data relevant to the certain user.

5. The computer system of claim 1, further comprising a user interface configured to suggest to the certain user to run an instantiation of the certain template.

6. The computer system of claim 1, wherein the certain template is utilized by at least two different users belonging to two different organizations of the different organizations.

7. The computer system of claim 1, wherein the at least one processor and the memory further cooperate to function as a data cleaner configured to remove proprietary data from the certain template.

8. The computer system of claim 1, wherein the at least one processor and the memory further cooperate to function as a test identifier configured to receive data obtained from monitoring the certain user running test scenarios on a software system that belongs to certain organization and to identify the runs of test scenarios.

9. The computer system of claim 8, further comprising a monitoring module configured to monitor the certain user running the test scenarios on the software system that belongs to the certain organization.

10. The computer system of claim 1, wherein first and second profiles that are similar are characterized by at least one of: number of transactions described in the first profile that are also described in the second profile reaches a first predetermined threshold greater than one, proportion of transactions described in first profile that are also described in the second profile reaches a second predetermined threshold, and a value of a similarity function that receives representation of the first and second profiles as input reaches a third predetermined threshold.

11. A computer implemented method for selecting a test scenario template for a certain user based on similarity of a profile of template utilization by the certain user to profiles of template utilization by other users, comprising:
receiving runs of test scenarios, run by a certain user belonging to a certain organization on a software system belonging to the certain organization;
identifying, from the runs, test scenario templates utilized by the certain user; wherein the certain user utilizes a template by running an instantiation of the template;
generating a profile of the certain user based on the test scenario templates; wherein the profile indicates test scenario templates utilized by the certain user;
receiving profiles of users belonging to different organizations; wherein the certain organization is not one of the different organizations, and the profiles indicate test scenario templates utilized by the users belonging to the different organizations;
comparing, by a computer system having a processor and memory, between the profile of the certain user and the profiles of the users and identifying at least one profile of a user, from among the profiles of the users, for which the number of test scenario templates indicated as utilized by the user, which are also indicated in the profile of the certain user as utilized by the certain user, reaches a predetermined threshold; and
selecting a certain template from among templates indicated as utilized in the at least one profile;
wherein the profile of the certain user does not comprise indication that the certain user utilized the certain template.

12. The computer implemented method of claim 11, further comprising selecting the certain template, from among templates that are indicated as utilized in the at least one profile, based on number of different users that utilized the templates.

13. The computer implemented method of claim 11, further comprising selecting the certain template, from among templates that are indicated as utilized in the at least one profile, based on number of different organizations with users that utilized the templates.

14. The computer implemented method of claim 11, further comprising customizing the certain template for the certain user by adding to the certain template proprietary data relevant to the certain user.

15. The computer implemented method of claim 11, wherein the certain template is utilized by at least two different users belonging to two different organizations of the different organizations.

16. A non-transitory computer-readable medium for use in a computer to select a test scenario template for a certain user based on similarity of a profile of template utilization by the certain user to profiles of template utilization by other users; the computer comprises a processor, and the non-transitory computer-readable medium comprising:
program code for receiving runs of test scenarios, run by a certain user belonging to a certain organization on a software system belonging to the certain organization;
program code for identifying, from the runs, test scenario templates utilized by the certain user;
wherein the certain user utilizes a template by running an instantiation of the template;
program code for generating a profile of the certain user based on the test scenario templates;
wherein the profile indicates test scenario templates utilized by the certain user;
program code for receiving and profiles of users belonging to different organizations; wherein the certain organization is not one of the different organizations, and the profiles indicate test scenario templates utilized by the users belonging to the different organizations;
program code for comparing between the profile of the certain user and the profiles of the users and identifying at least one profile of a user, from among the profiles of the users, for which the number of test scenario templates indicated as utilized by the user, which are also indicated in the profile of the certain user as utilized by the certain user, reaches a predetermined threshold; and
program code for selecting a certain template, from among templates indicated as utilized in the at least one profile, which is appropriate for the certain user; wherein the profile of the certain user does not comprise indication that the certain user utilized the certain template.

17. The non-transitory computer-readable medium of claim 16, further comprising program code for selecting the certain template, from among templates that are indicated as utilized in the at least one profile, based on number of different users that utilized the templates.

18. The non-transitory computer-readable medium of claim 16, further comprising program code for selecting the certain template, from among templates that are indicated as utilized in the at least one profile, based on number of different organizations with users that utilized the templates.

19. The non-transitory computer-readable medium of claim 16, further comprising program code for identifying the runs of test scenarios run by the certain user on a software system that belongs to the certain organization from data obtained from monitoring the certain user.

20. The non-transitory computer-readable medium of claim 19, further comprising program code for monitoring the certain user running the test scenarios on the software system that belongs to the certain organization.

* * * * *